(12) United States Patent
Horibe et al.

(10) Patent No.: US 8,370,344 B2
(45) Date of Patent: Feb. 5, 2013

(54) INFORMATION PROCESSING APPARATUS, INFORMATION PROCESSING METHOD, INFORMATION PROCESSING PROGRAM AND RECORDING MEDIUM FOR DETERMINING AN ORDER OF DISPLAYING SEARCH ITEMS

(75) Inventors: Shiro Horibe, Kanagawa (JP); Hideo Itoh, Tokyo (JP); Tetsuya Ikeda, Tokyo (JP); Takuya Hiraoka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 430 days.

(21) Appl. No.: 12/431,260

(22) Filed: Apr. 28, 2009

(65) Prior Publication Data
US 2009/0276418 A1 Nov. 5, 2009

(30) Foreign Application Priority Data
May 2, 2008 (JP) .................................. 2008-120482

(51) Int. Cl.
*G06F 7/00* (2006.01)
*G06F 17/30* (2006.01)
(52) U.S. Cl. ......... 707/728; 707/731; 707/741; 707/749
(58) Field of Classification Search .................. 707/728, 707/731, 741, 749
See application file for complete search history.

(56) References Cited

U.S. PATENT DOCUMENTS

| | | | |
|---|---|---|---|
| 2002/0073095 A1* | 6/2002 | Ohga | 707/102 |
| 2002/0107842 A1* | 8/2002 | Biebesheimer et al. | 707/3 |
| 2004/0230570 A1* | 11/2004 | Hatta et al. | 707/3 |
| 2005/0210008 A1* | 9/2005 | Tran et al. | 707/3 |
| 2006/0074860 A1* | 4/2006 | Ishiguro et al. | 707/3 |
| 2006/0230031 A1 | 10/2006 | Ikeda et al. | |
| 2006/0248055 A1* | 11/2006 | Haslam et al. | 707/3 |
| 2007/0208719 A1* | 9/2007 | Tran | 707/3 |
| 2007/0233659 A1* | 10/2007 | Kim | 707/3 |
| 2009/0132496 A1* | 5/2009 | Chen et al. | 707/3 |
| 2009/0234688 A1* | 9/2009 | Masuyama et al. | 705/7 |

FOREIGN PATENT DOCUMENTS
JP 2003-323457 11/2003
JP 2007-233752 9/2007
WO WO 2006/115260 A1 11/2006

OTHER PUBLICATIONS

Office Action issued Aug. 7, 2012 in Japanese Patent Application No. 2008-120482.

* cited by examiner

*Primary Examiner* — John E Breene
*Assistant Examiner* — Joshua Bullock
(74) *Attorney, Agent, or Firm* — Oblon, Spivak, McClelland, Maier & Neustadt, L.L.P.

(57) ABSTRACT

An information processing apparatus is disclosed which determines, based on fitness to a specified condition, an order of displaying multiple to-be-searched information items which are pre-stored. The apparatus includes a specifying-condition information obtaining unit, an index-information obtaining unit, a population-limiting information obtaining unit, an index-information modifying unit, and a fitness calculating unit.

13 Claims, 12 Drawing Sheets

| ID | DOCUMENT NUMBER | |
|---|---|---|
| 001 | **-***a | |
| 002 | **-***b | |
| 003 | **-***c | |
| 004 | **-***d | |
| 005 | **-***e | |
| 006 | **-***f | ... |
| 007 | **-***g | |
| 008 | **-***h | |
| 009 | **-***i | |
| 010 | **-***j | |
| ⋮ | ⋮ | |

(b)

| ID | DOCUMENT NUMBER | |
|---|---|---|
| 001 | **-***a | |
| 002 | **-***b | |
| 003 | **-***c | ... |
| 004 | **-***d | |
| 005 | **-***e | |
| ⋮ | ⋮ | |

(a)

| KEYWORD | ID | DF |
|---|---|---|
| A | 001, 005, 010 | 3 |
| B | 002, 004, 006, 008 | 4 |
| C | 003, 006, 009 | 3 |
| ... | ... | ... |

(b)

| KEYWORD | ID | DF |
|---|---|---|
| A | 001, 005 | 2 |
| B | 002, 004 | 2 |
| C | 003 | 1 |
| ... | ... | ... |

(a) NORMAL-SENTENCE SPECIFICATION: D, ON WHICH C IS PERFORMED BY B, OF A & CLASSIFYING-INFORMATION SPECIFICATION: G06F 17/30

(b) D,/ON/WHICH/C/IS/PERFORMED/BY/B,/OF/A (c)
A
B
C
D

FIG.10

| ID | DOCUMENT NUMBER | FITNESS (%) |
|---|---|---|
| 001 | **-***a | 67 |
| 004 | **-***d | 56 |
| 003 | **-***c | 47 |
| 005 | **-***e | 44 |
| 002 | **-***b | 38 |

FITNESS CALCULATION RESULT DISPLAY SCREEN

| ID | DOCUMENT NUMBER | DATA LENGTH (KB) | |
|---|---|---|---|
| 001 | **-***a | 30 | |
| 002 | **-***b | 20 | |
| 003 | **-***c | 40 | |
| 004 | **-***d | 50 | |
| 005 | **-***e | 30 | ... |
| 006 | **-***f | 10 | |
| 007 | **-***g | 50 | |
| 008 | **-***h | 80 | |
| 009 | **-***i | 90 | |
| 010 | **-***j | 10 | |
| ⋮ | | | |
| AVERAGE | | 41 | |

(b)

| ID | DOCUMENT NUMBER | DATA LENGTH (KB) | |
|---|---|---|---|
| 001 | **-***a | 30 | |
| 002 | **-***b | 20 | |
| 003 | **-***c | 40 | ... |
| 004 | **-***d | 50 | |
| 005 | **-***e | 30 | |
| ⋮ | | | |
| AVERAGE | | 34 | |

INFORMATION PROCESSING APPARATUS, INFORMATION PROCESSING METHOD, INFORMATION PROCESSING PROGRAM AND RECORDING MEDIUM FOR DETERMINING AN ORDER OF DISPLAYING SEARCH ITEMS

TECHNICAL FIELD

The present invention generally relates to an information processing apparatus, an information processing method, an information processing program, and a recording medium, and particularly relates to sorting of information to be searched.

BACKGROUND ART

A technique for searching electronic data and displaying search results is becoming increasingly important due to an increased number of search results due to an increased amount of information to be searched. This is because information sought is buried in a large amount of search results, so that finding the information is becoming difficult. As such a search technique, a technique is being proposed such that a search is executed based on a search condition set according to an analysis of a search request input and the search results are ordered by a unit for calculating predetermined scores, for example.

In such a search technique as described above, for an increased speed of the search, words, etc., are extracted from a document to be searched to create an index and save the created index (see Patent Document 1, for example) in advance. Patent Document 1 discloses a proposed method of obtaining correct search results when documents to be searched are divided into multiple sets of documents and an index is created for the respective multiple sets as the number of documents to be searched increases.

In the above-described technique of calculating the predetermined scores, TF (Term Frequency), which is the number of times a search term, etc., included in the specified search condition appears in the respective documents or is used therein, and DF (Document Frequency), which is the number of documents which includes the search term, etc., are used. Therefore, creating the index as described above makes it possible to complete a search within a short time period.

Moreover, depending on the search condition, documents to be searched may be limited. For example, for searching a patent document, this includes cases such that, in addition to specifying words in the document, classifying information such as the IPC (International Patent Classification) or an FI (File Index) is set. When the classifying information is set in such a manner as described above, the search using the above-mentioned terms is carried out within the scope of simultaneously-specified classifying information, i.e., within the scope of the limited population.

Patent Document 1 JP2007-233752A

Here, for example, a search using terms is carried out using TF and DF as described above. As one of such techniques, a calculation is carried out such that the smaller the DF, the more important the term is handled as being important, and the higher the score. The DF is pre-registered in the above-described index. In the related art, even when a population is limited, scores are calculated using the DF registered in the index.

However, as described above, if the population is limited and the number of documents and images included in the documents to be searched decreases, the frequency of occurrence of information to be searched changes, so that calculating the scores using the DF which is pre-registered in the index could cause an inaccurate score to be calculated.

Moreover, as image information may be converted to a one-dimensional code sequence to calculate the scores using a technique similar to term searching, the above-described problem may become a problem not only for the term-searching DF but also for the image search.

DISCLOSURE OF THE INVENTION

According to an embodiment of the present invention, an information processing apparatus is provided which determines, based on fitness for a specified condition, an order of displaying a plurality of to-be-searched information items which items are pre-stored, including a specifying-condition information obtaining unit which obtains specifying-condition information on the specified condition; an index-information obtaining unit which obtains index information which includes information-element inclusion-mode information on to-be-searched information including an information element of the to-be-searched information items and the information element included in any of the to-be-searched information items; a population-limiting information obtaining unit which obtains population-limiting information, which population-limiting information is included in the obtained specifying-condition information, which population-limiting information limits information for which the order is determined of the to-be-searched information items; an index-information modifying unit which modifies the information-element inclusion mode information included in the obtained index information to information on to-be-searched information including the information element of the to-be-searched information items limited by the population-limiting information; and a fitness calculating unit for calculating the fitness based on the information element inclusion mode information associated with an information element corresponding to a specifying information element in the modified index information and an information element included in the specifying-condition information.

BRIEF DESCRIPTION OF THE DRAWINGS

Other objects, features, and advantages of the present invention will become more apparent from the following detailed descriptions when read in conjunction with the accompanying drawings, in which:

FIG. 4 is a diagram showing document information stored in a to-be-searched information DB 200 according to an embodiment of the present invention;

FIG. 5 is a diagram showing exemplary entry information according to an embodiment of the present invention;

FIG. 6 is a diagram showing exemplary specifying-condition information according to an embodiment of the present invention;

FIG. 10 is a diagram showing a screen displaying fitness calculation results according to an embodiment of the present invention;

FIG. 12 is a diagram showing data lengths and their average value of documents information according to another embodiment of the present invention.

BEST MODE FOR CARRYING OUT THE INVENTION

Descriptions are given next, with reference to the accompanying drawings, of embodiments of the present invention.

The present invention is not limited to the specifically disclosed embodiments, but variations and modifications may be made without departing from the scope of the present invention.

Embodiments according to the present invention are described, referring to FIG. 1 through FIG. 12.

Embodiment 1

Below embodiments of the present invention are described in detail with reference to the drawings.

In the present embodiment, description is provided for an information search system including an information search apparatus for searching patent documents.

Figure 1:
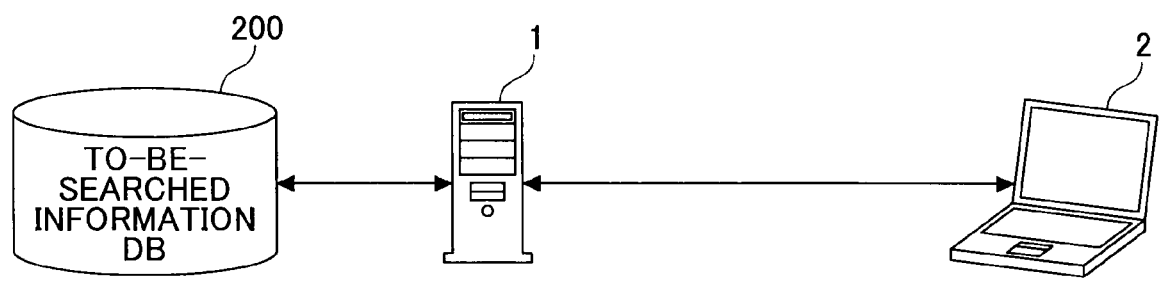
FIG. 1 is a drawing showing an operation of an information search system according to an embodiment of the present invention.

FIG. 1 is a diagram showing an exemplary operation of an information search system according to the present embodiment. As shown in FIG. 1, the information search system according to the present embodiment includes an information search apparatus 1, a client apparatus 2, and a to-be-searched information DB 200. The client apparatus 2 may be a general-purpose information processing apparatus such as a personal computer (PC), etc. The information search apparatus 1, which is connected to the client apparatus 2 via a network, is operated as a server for searching documents information stored in the to-be-searched information DB 200 upon receiving a search request from the client apparatus 2.

The to-be-searched DB 200 stores patent documents information as information to be searched. In other words, the information to be searched according to the present embodiment is patent documents information stored in the to-be-searched information DB 200. As shown in FIG. 1, while an example such that the to-be-searched information DB 200 is provided separately from the information search apparatus 1 is explained, it is also possible to arrange the to-be-searched information DB 200 within the information search apparatus 1. The to-be-searched information DB 200 is configured by a non-volatile storage medium such as HDD, etc.

Figure 2:
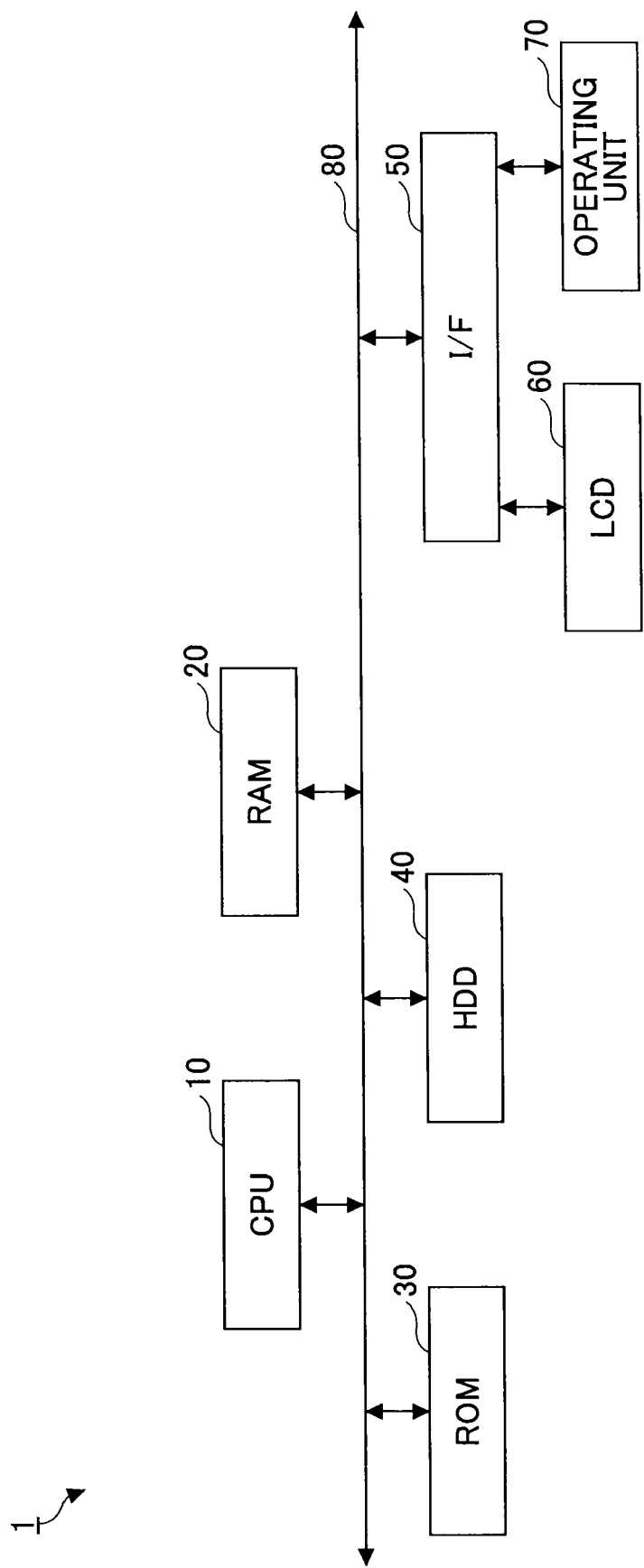
FIG. 2 is a block diagram schematically showing a hardware configuration of the information search apparatus according to an embodiment of the present invention.

Next, a hardware configuration of the information search apparatus 1 according to the present embodiment is described. FIG. 2 is a block diagram showing the hardware configuration of the information search apparatus 1 according to the present embodiment. As shown in FIG. 2, the information search apparatus 1 according to the present embodiment has the same configuration as an information processing terminal (e.g., a general-purpose server or a personal computer (PC). In other words, in the information search apparatus 1 according to the present embodiment, a CPU (Central Processing Unit) 10, a RAM (Random Access Memory) 20, a ROM (Read Only Memory) 30, an HDD (Hard Disk Drive) 40, and an interface (I/F) 50 are connected via the bus 80. Moreover, an LCD (Liquid Crystal Display) 60 and an operating unit 70 are connected to the I/F 50.

The CPU 10, which is a processing unit, controls operations of the entire information search apparatus 1. The RAM 20, which is a volatile storage medium allowing high-speed reading and writing of information, is used as a work area for the CPU 10 to process the information. The ROM 30, which is a read-only non-volatile storage medium, stores therein programs (e.g., firmware). The HDD 40, which is a non-volatile storage medium allowing reading and writing of information, stores therein an OS (Operating System) and various control programs and application programs, etc. The I/F 50 connects the bus 80 and various hardware units and networks, and controls them. The LCD 60 is a visual user interface for the user to confirm the status of the information search apparatus 1. The operating unit 70 is a user interface (a keyboard or a mouse, etc.) for the user to input information into the information search apparatus 1. As described in conjunction with FIG. 1, the information search apparatus 1 according to the present embodiment is operated as a server. Therefore, the user interfaces (e.g., the LCD 60 and the operating unit 70) may be omitted.

In such a hardware configuration as described above, a software controller is configured by a program stored in a storage medium such as the ROM 30, the HDD 40, or an optical disk (not shown) being read into the RAM 20, and operating as controlled by the CPU 10. The software controller and the hardware are combined to form a functional block which implements a function of an information search apparatus 1 according to the present embodiment.

Figure 3:
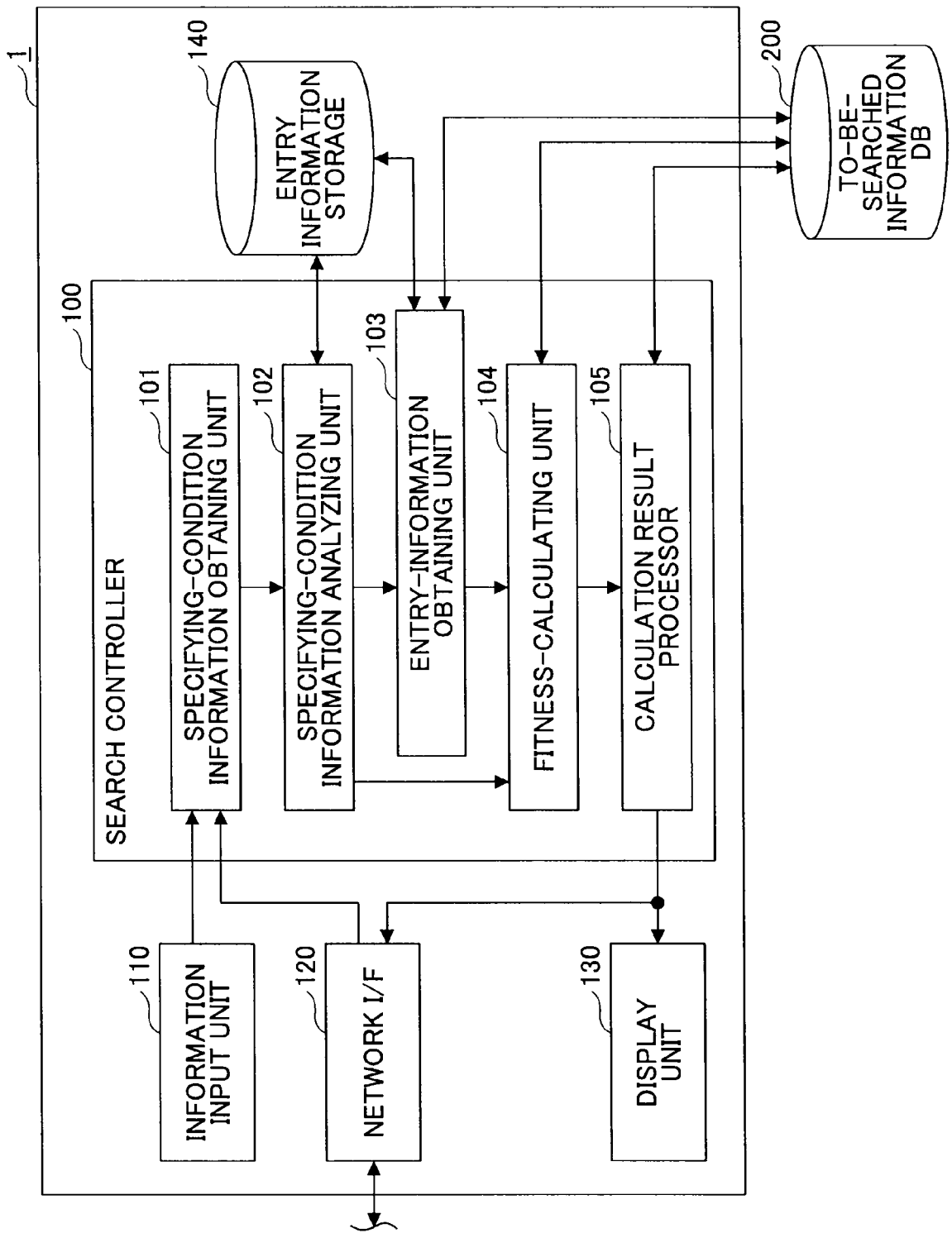
FIG. 3 is a block diagram showing a functional configuration of the information search apparatus according to an embodiment of the present invention.

Next, a functional block of the information search apparatus 1 according to the present embodiment is described with reference to FIG. 3, which is a block diagram showing functional blocks of the information search apparatus 1 and a to-be-searched information DB 200 storing information to be searched by the information search apparatus 1 according to the present invention. As shown in FIG. 3, the information search apparatus 1 has a search controller 100, an information input unit 110, a network interface (I/F) 120, a display unit 130, and an entry information DB 140.

The information input unit 110, which is arranged such that a user operates the information search apparatus 1 to input information into the search controller 100, is implemented by the I/F 50 and the operating unit 70 (shown in FIG. 2). The network interface (I/F) 120, which is an interface for the information search apparatus 1 to obtain information via a network or to transmit information via a network, is implemented by the interface 50 (I/F 50, shown in FIG. 2), or, more specifically, an Ethernet-connecting interface or a USB (Universal Serial Bus)-connecting interface.

The display unit 130, which is arranged for displaying the operating status of the information search apparatus 1 and the search results, is implemented by the interface 50 and LCD 60 (shown in FIG. 2). The entry information storage 140, which is a database storing entry information of patent documents stored in the to-be-searched information DB 200, is implemented by a program which operates in the HDD 40 and RAM 20 (shown in FIG. 2). Here, an explanation with reference to the drawings is provided with respect to examples of information stored in the to-be-searched information DB 200, and entry information stored in the entry information storage 140.

FIG. 4(a) is a diagram showing information stored in the to-be-searched information DB 200. As shown in FIG. 4, the to-be-searched information DB 200 stores, as documents listing information, IDs identifying respective documents, and respective patent document numbers associated with the IDs, in addition to patent documents information, which is information to be searched. In the present embodiment, for ease of understanding, as shown in FIG. 4(a), an example is described of a case such that ten documents with ID "001" to "010" are stored in the to-be-searched information DB 200.

FIG. 5(a) is a diagram showing information stored in the entry information storage 140. As shown in FIG. 5(a), entry information stored by the entry information storage 140 is stored such that a keyword showing a word used in a document stored in the to-be-searched information DB 200, an ID showing the documents including the keyword, and a DF (Document Frequency), which is the number of documents which include the keyword. In other words, the entry information storage 140 stores index information collating a keyword as an information element included in any of to-be-searched information items, and information on a document which is to-be-searched information including the information element as described above.

An example of FIG. 5(a) shows that documents including a keyword "A" are documents with IDs of "001", "005", and "010", or, in other words, documents with IDs of "**-*a", "-*e" and "-*j", which are shown in FIG. 4(a), and that the DF is "3". In this way, the entry information according to the present embodiment is used as index information which classifies documents stored in the to-be searched information DB 200 per keyword included in the respective documents, with the entry-information storage 140 functioning as an index information storage. Moreover, ID information and DF information shown in FIG. 5**(a), which are information items related to an inclusion mode of a keyword which is an information element, are used as information-element inclusion mode information.

The search controller 100, which is arranged to serve a search function of the information search apparatus 1 according to the present embodiment, has a specifying-condition information obtaining unit 101, a specifying-condition information analyzing unit 102, an entry-information obtaining unit 103, a fitness calculating unit 104, and a calculation result processor 105. The search processor 100 is configured by a program loaded into the RAM 20 (shown in FIG. 2) operating according to the control of the CPU 10.

The specifying-condition information obtaining unit 101 obtains, as specifying-condition information, information input by a user via an information input unit 110 or information input via a network via a network interface 120. The specifying-condition information obtaining unit 101 is configured by a program loaded into the RAM 20 (shown in FIG. 2) operating according to the control of the CPU 10. The specifying-condition information is a condition specified by a user as a condition for extracting a desired document.

With reference to FIG. 6(a), an example is explained of specifying condition information obtained by the specifying-condition information obtaining unit 101. FIG. 6(a) shows an example such that normal-sentence information and classifying information are included as specifying-condition information. In the case shown in FIG. 6(a), calculating of fitness to "D, on which C is performed by B, of A" is specified for documents to which "G06F 17/30" is assigned as the IPC (International Patent Classification), or classifying information. For using image information as the specifying-condition information, a path, etc., storing image information is specified to input image information.

The specifying-condition information analyzing unit 102 analyzes specifying-condition information obtained by the specifying-condition information obtaining unit 101, and converts the analyzed information to an information format according to the calculated fitness mode. Moreover, according to the analyzing of the specifying-condition information, the specifying-condition information analyzing unit 102 determines whether a condition limiting a population-to-be-searched (below called population-limiting information) is included in the specifying-condition information. In other words, the specifying-condition information analyzing unit 102 functions as a population-limiting information obtaining unit. The population-limiting information obtaining unit is configured by a program loaded into the RAM 20 (shown in FIG. 2) operating according to the CPU 10 control.

Population-limiting information by the specifying-condition information analyzing unit 102 is detected according to the present embodiment. The detected population-limiting information, details of which are described below, is used as population-limiting information when classifying information is specified as shown in FIG. 6(a), for example. As shown in FIG. 6(a), when the classifying information is specified as specifying-condition information, the classifying information is used as classifying-information specifying information. In other words, the specifying-condition information analyzing unit 102 obtains classifying-information specifying information as population-limiting information. Such a mode as described above makes it possible for the presence of the population-limiting information in the specifying-condition information to be easily determined. The specifying-condition information analyzing unit 102 inputs, into the entry information obtaining unit 103, information on whether the population-limiting information is included in the specifying-condition information as a result of analyzing the specifying-condition information. Moreover, when the specifying-condition information includes population-limiting information, the specifying-condition information analyzing unit 102 inputs the population-limiting information into the entry information obtaining unit 103.

Here, modes of analyzing and transforming specifying-condition information by the specifying-condition information analyzing unit 102 are described with reference to FIGS. 6(a)-6(c). When the normal sentence shown in FIG. 6(a) is input as specifying-condition information, the specifying-condition information analyzing unit 102 parses the sentence into individual words. As shown in FIG. 6(b), in the present embodiment, "D, on which C is performed by B, of A" is parsed as "D, / on / which / C / is / performed / by / B, / of / A". When image information is used as the specifying-condition information, the process of parsing the above sentence into words is replaced by the process of converting the image information into a one-dimensional character sequence.

Then, of those words so parsed, the specifying-condition information analyzing unit 102 deletes words which do not have a meaning by themselves, and extracts only words which do have a meaning by themselves. In the present embodiment, words "A", "B", "C" and "D" are extracted. The words extracted as shown in FIG. 6(c) are used as keywords in calculating fitness. The specifying-condition information analyzing unit 102 inputs, into the fitness calculating unit 104, specifying-condition information converted as shown in FIG. 6(c).

The entry-information obtaining unit 103 obtains entry information from the entry information storage 104. In other words, the entry information obtaining unit 103 functions as an index information obtaining unit. The index information obtaining unit is configured by a program loaded into the RAM 20 (shown in FIG. 2) operating according to the CPU 10 control. Moreover, the entry-information obtaining unit 103 obtains limited population list information, or, in other words, list information (below called narrowed-down documents list information) of documents narrowed down by population-limiting information based on population-limiting information input from the specifying-condition information analyzing unit 102. Then, the entry-information obtaining unit 103 modifies the information of the entry-information obtaining unit 103 based on the narrowed-down documents list information. In other words, the entry-information obtaining unit 103 functions as an index-information modifying unit. The index-information modifying unit is configured by a program loaded into the RAM 20 (shown in FIG. 2) operating according to the CPU 10 control. The process by the entry-information obtaining unit 103 is performed according to the present embodiment. The entry-information obtaining unit 103 inputs the modified entry information into the fitness calculating unit 104.

The fitness calculating unit 104 calculates the fitness of each document stored in the to-be-searched information DB 200 with respect to the condition specified by specifying-condition information based on converted specifying-condition information input from the specifying-condition information analyzing unit 102 and entry information input from the entry information obtaining unit 103. The fitness calculating unit 104 is configured by a program loaded into the RAM 20 (shown in FIG. 2) operating according to the CPU 10 control. The process of calculating the fitness by the fitness calculating unit 104 is described below in detail.

The calculation result processor 105 generates fitness-information displaying information for displaying, on the display unit 130, or a display of the client apparatus 2, a fitness list per document calculated by the fitness calculating unit 104. In other words, the calculation result processor 105 functions as a display information generator. The display information generator is configured by a program loaded into the RAM 20 (shown in FIG. 2) operating according to the CPU 10 control.

Figure 7:
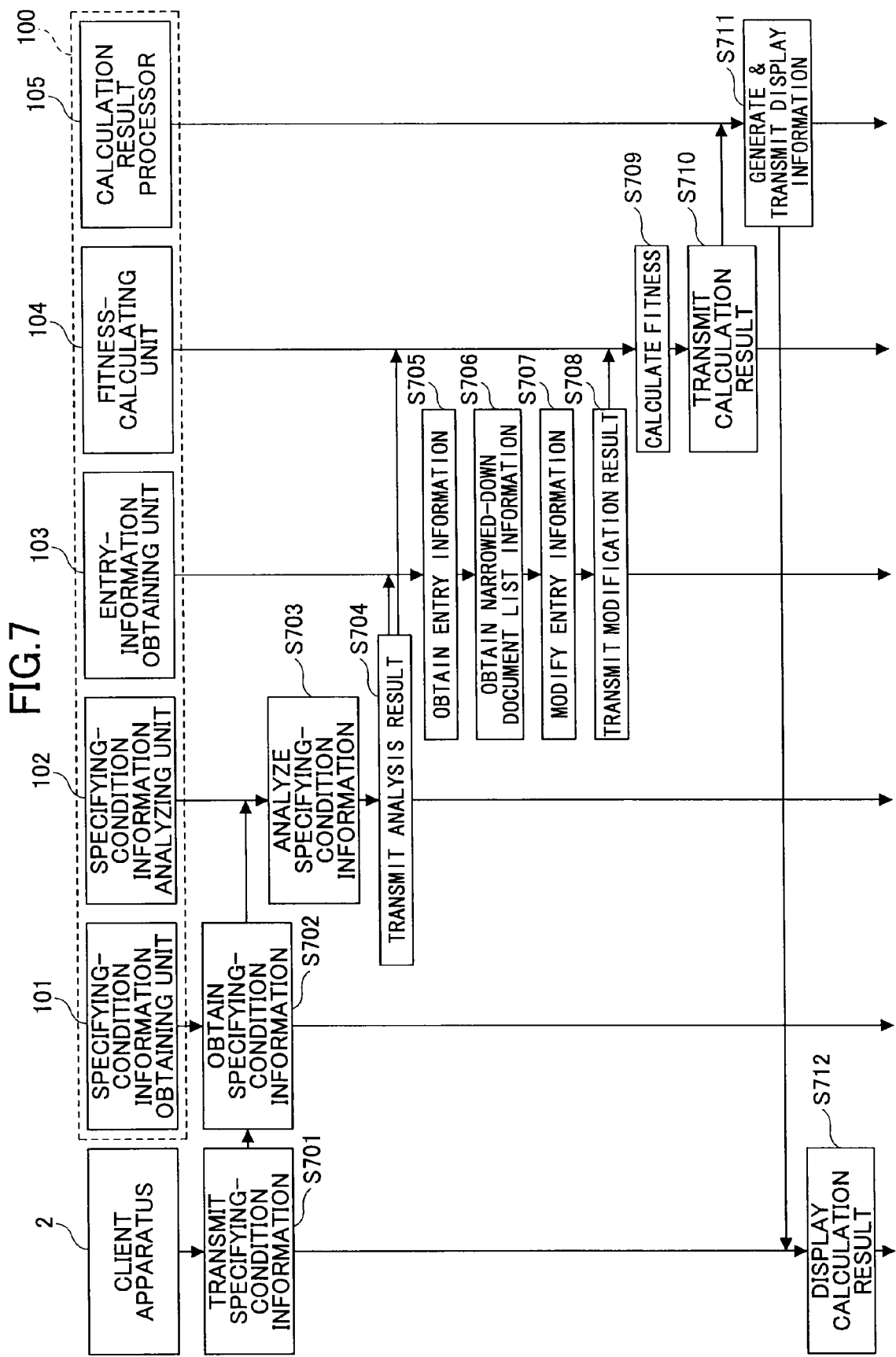
FIG. 7 is a sequence diagram showing an operation of the information search system according to an embodiment of the present invention.

Next, an operation of the information search system according to the present embodiment is described with reference to the drawings. FIG. 7 is a sequence diagram showing an information search operation in the information search system according to the present embodiment. As shown in FIG. 7, when information on documents registered in the to-be-searched information DB 200 is searched, the user first operates the client apparatus 2 to input the search condition and transmits the input condition as specifying-condition information to the information search apparatus 1 (S701). Below, an example is described of a case such that the user operates the client apparatus 2 to utilize the functions of the information search apparatus 1.

The information-specifying information transmitted to the information search apparatus 1 is input to the information search apparatus 1 from the network interface 120, and is obtained by the specifying-condition information obtaining unit 101 of the information search unit 100 (S702). The specifying-condition information obtaining unit 101 inputs the obtained specifying-condition information to the specifying-condition information analyzing unit 102 (S702). The specifying-condition information analyzing unit 102 obtains the specifying-condition information from the specifying-condition information obtaining unit 101 to analyze the input specifying-condition information (S703).

In S703, the specifying-condition information analyzing unit 102 converts a normal sentence included in the specifying-condition information as described in FIG. 6(*a*)-(*c*). Moreover, the specifying-condition information analyzing unit 102 determines whether population-limiting information is included in the condition-specifying information. In the present embodiment, as described in FIG. 6(*a*), as "G06F 17/30" is specified as information limiting classifying information, the specifying-condition information analyzing unit 102 determines that population-limiting information is included. The specifying-information analyzing unit 102 transmits the analysis result by the S703 process to the entry-information obtaining unit 103 and the fitness calculating unit 104 (S704). Information transmitted to the fitness calculating unit 104 as analysis results is converted to specifying-condition information shown in FIG. 6(*c*).

Figure 8:
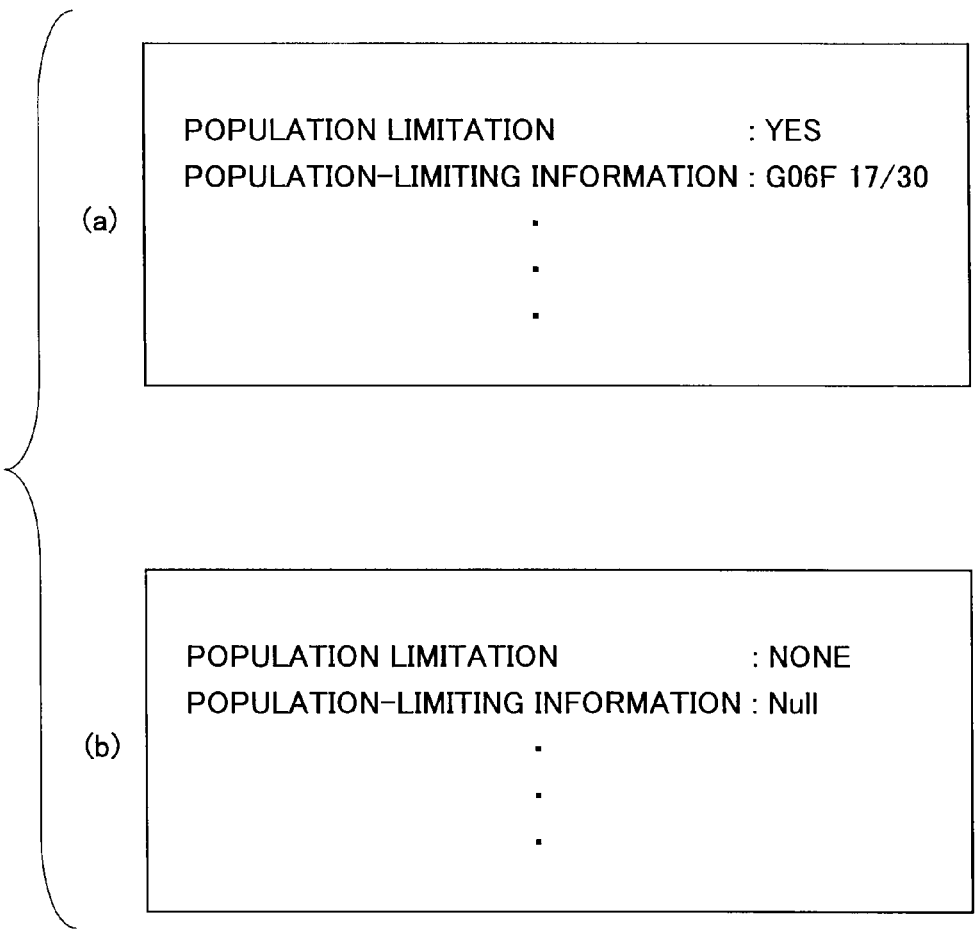
FIG. 8 is a diagram showing information on results of analyzing specifying-condition information according to an embodiment of the present invention.

FIGS. 8(*a*) and 8(*b*) are drawings showing analysis results information transmitted to the entry information obtaining unit 103 by the specifying-condition information analyzing unit 102. As shown in FIGS. 8(*a*) and 8(*b*), analysis results information (below called analysis-results-of-population-limiting information) transmitted to the entry-information obtaining unit 103 by the specifying-condition information analyzing unit 102 includes information (below called presence-of-population-limiting information) indicating whether population-limiting information is included in the specifying-condition information, and population-limiting information.

FIG. 8(*a*) is a drawing showing an example of a case such that, of population-limiting analysis results information, population-limiting information is included in the specifying-condition information. If the specifying-condition information includes the population-limiting information, the presence-of-population limiting information becomes information indicating "present", so that the population-limiting information becomes actual population-limiting information. In the present embodiment, as explained in FIG. 6(*a*), the population-limiting information becomes "G06F 17/30" as "G06F 17/30" is specified as classifying information.

On the other hand, FIG. 8(*b*) is a drawing showing an example such that, out of the population-limiting analysis results information, the specifying-condition information does not include population-limiting information. If the specifying-condition information does not include the population-limiting information, the presence-of-population-limiting information becomes information indicating "absent", so that the population-limiting information becomes "null" indicating a blank.

Once the population-limiting analysis result information is obtained from the specifying-condition information analyzing unit 102, the entry-information obtaining unit 103 obtains the entry information from the entry information storage 140 (S705). Then, based on the population-limiting information included in the population-limiting analysis results information obtained from the specifying-condition information analyzing unit 102, the narrowed-down documents list information is obtained from the to-be searched DB 200 (S706). In FIG. 4(*b*), in S705 of the present embodiment, an example is shown of information included in the narrowed-down documents list information obtained from the to-be-searched information DB 200 by the entry-information obtaining unit 103.

As shown in FIG. 4(*b*), the narrowed-down documents list information obtained by the entry-information obtaining unit 103 in S705 of the present embodiment includes identifying information showing five documents with ID "001" to "005". This is a result of narrowing down 10 documents of ID "001" to "010" based on the classifying information of "G06F 17/30". In this way, classifying information specifying an IPC of "G06F17/30" is used as population-limiting information limiting the population. As shown in FIG. 8(*b*), if the presence-of-population limiting information is information indicating "absent", or the population-limiting information is "Null", the entry-information obtaining unit 103 obtains, in S705, documents list information shown in FIG. 4(a), or information of documents not narrowed down.

Upon obtaining the entry information and narrowed-down documents list information, the entry-information obtaining unit 103 modifies the entry information based on an ID of a document included in the narrowed-down documents list information (S707). With reference to FIG. 5(b), a mode is described of modifying entry information by the entry-information obtaining unit 103. FIG. 5(b) is a drawing showing an example of information included in the entry information modified by the entry-information obtaining unit 103 in S707 of the present embodiment.

As described in FIG. 4(b), the narrowed-down documents list information includes documents with ID "001" to "005". Therefore, in S707, the entry-information obtaining unit 103 modifies the entry information such that the entry information includes documents with ID "001" to "005". In other words, in S707, the entry-information obtaining unit 103 modifies the entry information such that IDs (in the present embodiment, ID "006"-"010") of documents not included in the narrowed-down documents list information are deleted from the original entry information, and the DF is recalculated. In this way, the entry-information obtaining unit obtains modified entry information.

Once the modification of the entry information is completed, the entry information obtaining unit 103 transmits the modified entry information, which is a result of modification, to the fitness calculating unit 104 (S708). Upon obtaining converted specifying-condition information from the specifying-condition information analyzing unit 102 and obtaining modified entry information from the entry information obtaining unit 103, the fitness calculating unit 104 calculates the fitness of the documents to the specifying condition information based on the respective information items obtained (S709).

Here, a mode of calculating the fitness by the fitness calculating unit 104 in S709 is explained. The document fitness is determined according to the following equation:

$$\text{(Document fitness)} = {}^I\Sigma_{n=1} \text{Score}_n \quad (1)$$

Here, $\text{Score}_n$ indicated in equation (1) is the fitness for the search word n in the respective document. Here the search word n is, in this embodiment, the respective keywords of "A" through "D", as shown in FIG. 6(c). In other words, the search word n is a character sequence included in the specifying-condition information. Moreover, i shown in equation (1) is the number of search words included in the respective documents. In other words, the search word n is one (an n-th one) of the I search words included in one document.

Moreover, $\text{Score}_n$ is determined according to the following equation (2):

$$\text{Score}_n = \text{Hit}_n \times \text{Weight}_n \quad (2)$$

Here, $\text{Hit}_n$ shown in equation (2) is the number of hits for the search word n in the respective documents, or TF (Term Frequency). The fitness calculating unit 104 obtains, in S709, $\text{Hit}_n$ information by accessing the to-be-searched information DB 200. Moreover, $\text{Weight}_n$ shown in equation (2) is a weight value for the search word n.

Furthermore, $\text{Weight}_n$ is determined according to the following equation (3):

$$\text{Weight}_n = \text{Log(number of narrowed-down documents/} DF_n) \quad (3)$$

Here, the number of narrowed-down documents list shown in equation (3) shows the number of documents included in the narrowed-down documents list information shown in FIG. 4(b). Moreover, $DF_n$ shown in equation (3), which is a frequency of documents with the search word n, is information included in the modified entry information shown in FIG. 5(b).

Upon calculating the fitness to the specifying-condition information of the documents with ID "001" to "005" using equations (1) to (3), the fitness calculating unit 104 transmits the calculation result to the calculation result processor 105 (S710). Based on the calculation result obtained from the fitness calculating unit 104, the calculation result processor 105 generates display information for displaying calculation results, and transmits the generated information via the network interface 120 to the client apparatus 2 (S711). The client apparatus 2 displays the calculation result based on display information received from the information search apparatus 1 (S712).

In the related-art fitness calculating techniques, for determining $\text{Weight}_n$, DF of the entry information and the total number of documents stored in the to-be-searched information DB 200 are used regardless of the presence of the population limitation, so that calculating the fitness may lead to inaccurate results depending on the limiting mode of the population. On the contrary, the search controller 110 of the information search apparatus 1 according to the present embodiment determines whether the specifying-condition information includes population-limiting information. If the population-limiting information is included, the DF of the modified entry information and the number of narrowed-down documents are obtained from the modified entry information based on the population-limiting information to determine $\text{Weight}_n$. This makes it possible to more accurately calculate the fitness of the respective documents to the specifying-condition information.

As described above, whether the population-limiting information is included in the specifying-condition information is detected according to the present embodiment. In the present embodiment, a case has been described such that when classifying information such as IPC and FI is set in the specifying-condition information, it is detected as population-limiting information. For information used as classifying information, when using Japanese patent documents, it is also possible to use an F term (File forming term). Moreover, for searching United States patent publications, it is also possible to use a Current US Classification, etc. Such a mode as described above allows easily determining the presence of population-limiting information in the specifying-condition information.

Moreover, an example has been explained in the above embodiment of searching documents whose IPC is "G06F 17/30", for example. However, searching documents whose IPC is not "G06F 17/30" is also possible. In other words, even searching documents whose IPC is not "G06F 17/30" may be used as population-limiting information. Moreover, the classifying information may come in multiple numbers, not in a single number according to the above embodiment.

Figure 9:
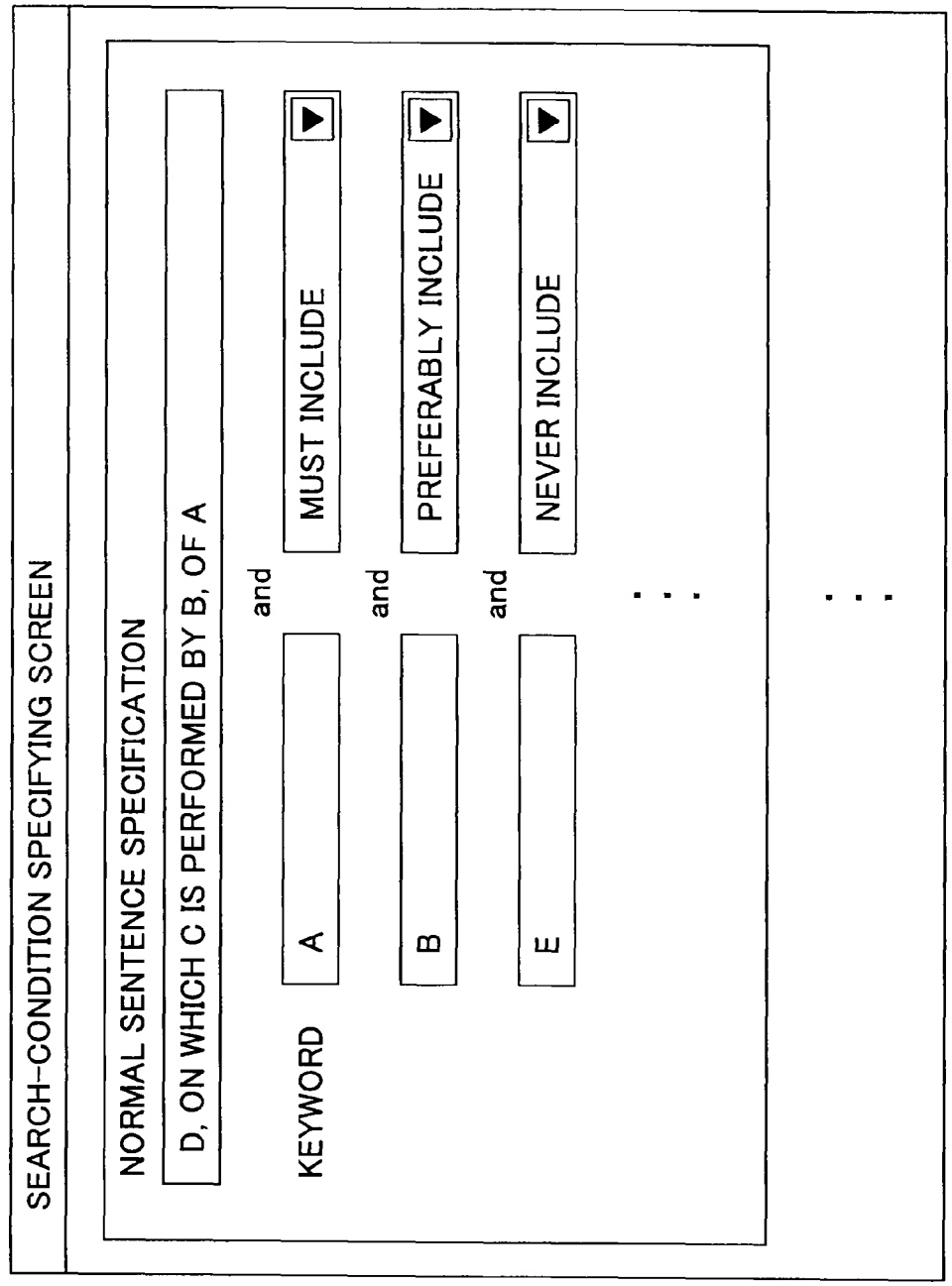
FIG. 9 is a diagram showing an input screen for specifying-condition information according to an embodiment of the present invention.

Moreover, specifying what is other than classifying information in the specifying-condition information may be a population limitation. Such a mode as described above is described with reference to a drawing. FIG. 9 is a drawing indicating a GUI displayed on a display of the client apparatus 2 when the user inputs specifying-condition information in the client apparatus 2. In FIG. 9, an example is shown of specifying a keyword as well as specifying a normal sentence, and also specifying how each keyword is used as a search condition.

In the example in FIG. 9, the conditions include "must include" a keyword "A", and "never include" a keyword "E".

Moreover, the conditions include "must include" a keyword "B". In such a case, "must include" the keyword "A", which represents calculating the fitness only for documents including the keyword "A", may be a condition limiting the population. In other words, the specifying-condition information analyzing unit 102 obtains, as population-limiting information, information on information elements specified as information to be included in the to-be-searched information. Such a mode as described above makes it possible to easily determine the presence of population-limiting information in the specifying-condition information.

Similarly, "never include" the keyword "E", which represents calculating the fitness only for documents not including the keyword "E", may be a condition limiting the population. Thus, in this case, the specifying-condition information analyzing unit 102 determines that the population-limiting information is included. In other words, the specifying-condition information obtaining unit 102 obtains, as the population-limiting information, information on an information element specified by the specifying-condition information, wherein documents including the information element are excluded from the search. In such a mode as described above, it is also possible to easily determine the presence of population-limiting information in the specifying-condition information.

Moreover, as shown in FIG. 9, there may be a GUI such that it is not possible to specify modes such as "must include", "preferably include" and "never include". In such a case as described above, when a keyword is specified, generally the fitness is calculated to a normal sentence specified from within documents including the keyword. In other words, the specified keyword, which is, in substance, handled in a manner similar to "must include", is assumed to be a population-limiting condition. In such a case as described above, the specifying-condition information analyzing unit 102 detects the specified keyword as population-limiting information. This makes it possible to obtain the same effect as described above.

Moreover, not limited to the exemplary modes, any information used for limiting documents stored in the to-be-searched information DB 200, for which documents the fitness is calculated according to the modes of the above equations (1) through (3), may be detected as population-limiting information to achieve the same effect as the above. For example, in a patent documents search, a bibliographic item which is additional information added to the documents may be specified to execute the search. Such specifying of the bibliographic item may be population-limiting information limiting the population to be searched. Such bibliographic items include human information (applicant, inventor, etc.), date information (filing date, publication date, date to which priority is retroactive, etc.), and prosecution history. In other words, the specifying-condition information obtaining unit 102 obtains, as the population-limiting information, information specified in the specifying-condition information, which information specified is additional-information specifying information specifying additional information added to the information to be searched. Such a mode as described above also makes it possible to easily determine the presence of population-limiting information in the specifying-condition information.

Next, with reference to FIG. 10, an exemplary calculation result display screen displayed on a display of a client apparatus 2 in FIG. 7, S712 is described. FIG. 10 is a drawing showing a fitness calculation result display screen displayed in FIG. 7 S709. As shown in FIG. 10, the fitness calculated for each document in S709 is displayed on the same line as the respective document, in other words, in association with the respective document ID and document number. Moreover, the respective documents are displayed in an order sorted by the fitness. In other words, the calculation result processor 105 generates calculation result display information such that the respective documents included in the narrowed-down documents list information are displayed in the order of the fitness calculated for the respective documents.

As described above, in the information search system according to the present embodiment, the information processing apparatus which calculates the fitness to the search condition based on the frequency of occurrence of predetermined information in the group of information items to be searched makes it possible to suitably execute the calculation of the fitness even when what is to be searched is limited.

In the above explanation, as explained using FIG. 6 and equations (1) through (3), with words or a character sequence included in the specifying-condition information as a keyword, the importance of the respective keyword is calculated based on DF and the result of the calculation is multiplied with the TF of the respective keywords in the respective documents to calculate the fitness of the respective documents. In other words, an example has been explained of calculating the fitness based on the mode of matching of the words. In addition, the above embodiment is applicable for what is other than the matching of the words.

For example, even in image search, image information included in what is to be searched (documents information in the above embodiment) is converted to a one-dimensional code sequence and image information input as a search condition is converted to a one-dimensional code sequence to make it possible to calculate the score in a technique similar to the words search. In this way, the above embodiments are applied and the fitness is suitably calculated not only in the words search but also in other search modes such as the image search.

Moreover, in the above embodiment, an example has been explained of patent documents as documents to be searched. In addition, the above embodiment is applicable for searching a library book. In such a case, the above-described classifying information such as IPC, etc., is replaced by information classifying books, including classifying numbers for Nippon Decimal Classification.

Furthermore, an example has been described in the above embodiment of a to-be-searched information DB 200 which is separately provided from the information search apparatus 1. However, the to-be-searched information DB 200 may be arranged within a storage area inside the information search apparatus 1. Moreover, in the above explanation, an example has been explained of the information search apparatus 1 and the to-be-searched information DB 200 being directly connected as shown in FIG. 3. However, they may be connected by a network via the network interface 120.

Similarly, in the above explanation, an example has been explained such that the entry information storage 140 is provided within the information search apparatus 1. Such a mode as described above allows the search controller 100 to quickly obtain entry information, making it possible to reduce the time needed for the search. In addition, the entry-information storage 140 may be configured as a different apparatus, for example, as a server connected to a network. In this case, the information search apparatus 1 accesses the entry information DB 140 via the network interface 120 and obtains the above-described entry information.

Moreover, in the above-described explanation, an example has been described of the user operating the client apparatus 2 and utilizing the function of the information search apparatus 1 which functions as a server via a network. In addition, the information input unit 110 and the display 130, shown in FIG. 3, can be used for the user to directly operate the information search apparatus 1. In this way, it is possible to obtain the same effect as what is described above. Moreover, it is also possible to execute a part of the respective functions as described above in the client apparatus 2. Furthermore, an example is explained of implementing the functions of the search controller 100 in one information search apparatus 1; it is also possible to implement the functions of the information search apparatus 1 with multiple servers operating in association.

Moreover, in the above explanation, an example has been explained of the information processor 1 being a server connected to the client apparatus 2 via the network. In addition, it is also possible for an MFP (Multifunction peripheral), which is connected to a LAN (Local Area Network) (office LAN, etc.), to have a first function. Moreover, not only an MFP, but any apparatus, which is connected to a network, having the functions of the information processor 1 according to the present embodiment makes it possible to obtain the same effect as what is described in the above.

Embodiment 2

In the present embodiment, an example is explained of adding other elements to the mode explained using equations (1) through (3) in the embodiment 1. For the element with the same letter as the embodiment 1, an element identical with or corresponding to what is in the embodiment 1 is shown, so that the explanation is omitted.

As explained in the equations (1) and (2) in the embodiment 1, $Hit_n$, which is a frequency of occurrence of the search word n in the respective documents is used. As a result, a more frequent occurrence of the search word n leads to the calculated fitness of the respective documents becoming correspondingly higher. However, the total length, or information amount included differs from one document to another. The larger amount of information included leads to a correspondingly higher possibility of the occurrence of the search word. Thus, a document which has a larger amount of information included leads to a likelihood of the calculated fitness becoming higher, preventing an accurate calculation of the fitness.

In order to overcome such problems as described above, in the related art techniques, the average information amount of documents information stored in the to-be-searched information DB 200, i.e., the average data length is referenced to adjust the calculated fitness. However, the referenced average data length is an average of all documents information stored in the to-be-searched information DB 200, so that the accuracy of adjusting the fitness is compromised as in the embodiment 1 when the population is limited.

The above problem is explained in further detail. For instance, as a salient example, a case is considered such that the average data length after the population limiting is 150 KB and the average data length before the population limiting is 150 MB. Moreover, a case is considered of a document A with a data length of 100 KB and a document B with a data length of 200 KB. In this case, the data length of the document A and the data length of the document B differ greatly. On the other hand, taking into account the average data length, before the limiting as a reference, they differ by an amount such that it may be determined as in an error range. In other words, for adjusting the fitness based on the average data length before the limiting, only a small adjustment of around the error range is performed, so that it is not possible to suitably adjust the fitness based on the average data length. The present embodiment solves such problems as described above.

The documents search system according to the present embodiment represents a mode such that, of the processes explained in FIG. 7 in the embodiment 1, a process by the entry-information obtaining unit 103 and the fitness calculating unit 104, or the process of S705 through S710 in FIG. 7 is added a new process. First, the process of the entry-information obtaining unit 103 according to the present embodiment is explained with reference to the drawings.

Figure 11:
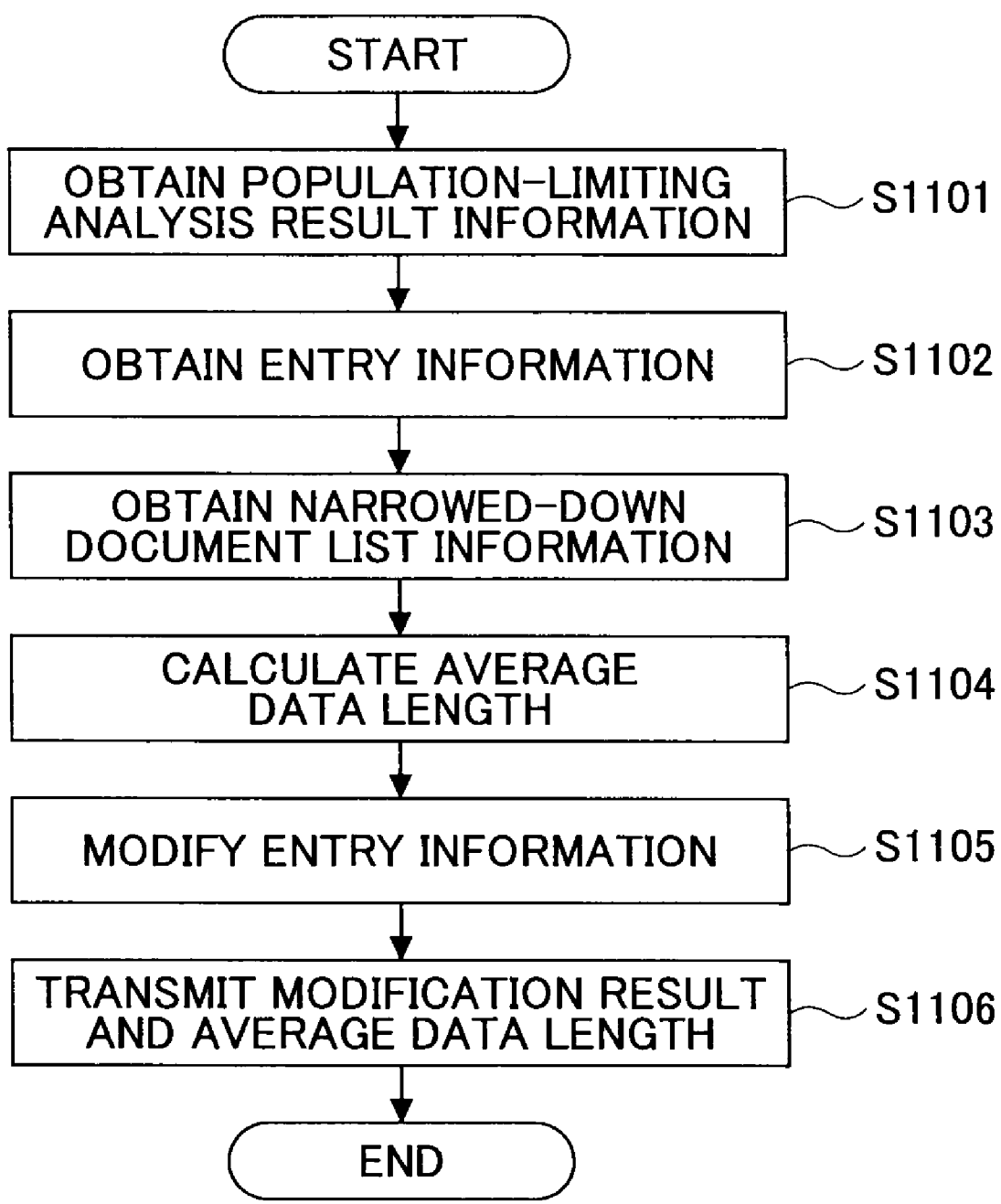
FIG. 11 is a diagram showing a process of an entry-information obtaining unit according to another embodiment of the present invention.

FIG. 11 is a flowchart showing the process of the entry information obtaining unit 103 according to the present embodiment. As shown in FIG. 11, the entry information obtaining unit 103, upon obtaining the population-limiting analysis result information (S1101), obtains entry information from the entry information storage 140 (S1102) in a manner similar to S705 and S706 of the embodiment 1, and obtains narrowed-down documents list information from the to-be-searched information DB 200.

Upon obtaining the narrowed-down documents list information, the entry information obtaining unit 103 obtains the data length of each document information item included in the narrowed-down documents list information (S1104). In other words, the entry information obtaining unit 103 functions as an information amount obtaining unit. The information amount obtaining unit is configured by a program loaded into the RAM 20 shown in FIG. 2, operating according to the CPU 10 control. Here, the data length information obtained by the entry information obtaining unit 103 in S1104 is described with reference to FIGS. 12($a$) and 12($b$).

FIG. 12($a$) is a drawing showing the data lengths of all documents information items stored in the to-be-searched information DB, and their average value. As shown in FIG. 12($a$), the average of the data lengths of all documents information items stored in the to-be-searched information DB 200 is "41 KB". On the other hand, FIG. 12($b$) is a drawing showing the data lengths of documents information items obtained by the entry information obtaining unit 103 in S1104. As shown in FIG. 12($b$), the average of the data lengths after narrowing down by limiting the population using classifying information is "34 KB".

Upon obtaining the data length of the respective document information items included in the narrowed-down documents list information, the entry-information obtaining unit 103 modifies the entry information in a manner similar to S707 of the embodiment 1 (S1105). Thereafter, the average data length, which is obtained in S1104 and the entry information which is modified in S1105 are transmitted to the fitness calculating unit 104 (S1106), and the process is completed.

The fitness calculating unit 104, which has obtained the modified entry information and the average data length information from the entry-information obtaining unit 103, calculates the fitness for each document using the calculations of equations (1) through (3). Then, the fitness calculated for each document is adjusted based on the average data length information obtained from the entry information obtaining unit 103. It is possible to use existing techniques for this adjusting process. For example, when the data length of the document to be adjusted for the fitness is determined and the determined data length is longer than the average data length, the calculated fitness is adjusted such that it is reduced based on the difference. On the other hand, when the data length of the document to be adjusted is shorter than the average data length, the calculated fitness is adjusted such that it is increased based on the difference.

Here, it is described, in the above embodiment, that the fitness calculation unit adjusts the calculated fitness. However, as the adjusted fitness is an accurate fitness which is actually used, the fitness calculating unit is also said to be calculating the fitness based on the average data length. In this way, in the information search system according to the present embodiment, the average data length of a set of documents limited by the population-limiting information is determined, and the fitness calculated for the respective documents are adjusted based on the average data length.

Moreover, in the above embodiment, a mode has been explained of calculating the average data length by the entry-information obtaining unit 103, which obtains the population-limiting information. However, the population-limiting information may be input to the fitness calculating unit 104, which calculates the average data length, thereby obtaining the same effect as what is described in the above.

Moreover, in the above embodiment, as described in S1104 in FIG. 11, an example has been explained of the entry-information obtaining unit 103 determining the average data length of all documents included in the narrowed-down documents list information. In other words, an example has been explained of obtaining the average value of information amounts included in the narrowed-down documents list information as information on the total of information amounts included by the respective limited information items to be searched, which information items are used for adjusting the fitness. Moreover, an example has been explained of setting, as a reference, the average data length of all documents included in the to-be-searched information DB 200 when the fitness is adjusted based on the average data length information obtained from the entry-information obtaining unit 103.

However, when the data amount (i.e., the number of documents) for calculating the average data length is large, the amount of computation required for the calculation of the average data length becomes huge. On the other hand, sampling may be used to reduce the computational amount. In other words, it may be arranged that the entry-information obtaining unit 103 determines, as information on the total of information amount included by the respective limited information items to be searched, the average of information amounts included in the documents randomly or non-randomly extracted from documents included in the narrowing-down documents list information.

Similarly, the fitness calculating unit 104 may use, as a reference, the average data length of documents randomly or non-randomly extracted from documents included in the to-be-searched information DB 200 when adjusting the fitness based on the average data length information obtained from the entry-information obtaining unit 103. Such a mode as described above makes it possible to reduce the amount of computation needed for calculating the average data length. For sampling documents from the narrowed-down documents list information, various schemes are possible for reducing the sampling error. For example, documents included in the narrowed-down documents list information may be sorted based on the respective information amounts, and odd- or even-numbered documents only may be extracted to reduce the calculated average data length error. Such an error reducing scheme using sampling as described above may also be applicable when the fitness calculating unit 104 calculates the average data length of documents included in the to-be-searched information DB 200 for adjusting the fitness based on the average data length information obtained from the entry-information obtaining unit 103.

The present application is based on the Japanese Priority Application No. 2008-120482 filed on May 2, 2008, the entire contents of which are hereby incorporated by reference.

The invention claimed is:

1. An information processing apparatus which determines, based on a fitness to a specified condition, an order of displaying a plurality of to-be-searched information items which are pre-stored, comprising:
    a storage unit which stores, in association, a keyword included in the plurality of to-be-searched information items stored in a database, information identifying to-be-searched information items stored in the database that include the keyword out of the plurality of to-be-searched information items stored in the database, and the number of the to-be-searched information items stored in the database that include the keyword out of the plurality of to-be-searched information items stored in the database;
    a specifying-condition information obtaining unit which obtains specifying-condition information on the specified condition, the specifying condition information includes text inputted by a user;
    a specifying-condition information analyzing unit which analyzes the text included in the specifying condition information and extracts at least one keyword as an information element;
    an index-information obtaining unit which obtains the keyword stored in the storage unit, the information identifying to-be-searched information items, and the number of the to-be-searched information items;
    a population-limiting information obtaining unit which obtains population-limiting information indicating classification information which classifies the plurality of to-be searched information items stored in the database from the obtained specifying-condition information;
    an identifying information obtaining unit which obtains information identifying the plurality of to-be-searched information items matching the classification information indicated by the population-limiting information out of the plurality of to-be-searched information items stored in the database;
    an index-information modifying unit which modifies the number of the to-be-searched information items obtained by the index-information obtaining unit to the number recalculated using only identifying information matching the identifying information obtained by the identifying information obtaining unit out of the information identifying the to-be-searched information items obtained by the index-information obtaining unit; and
    a fitness calculating unit which calculates the fitness of each of the plurality of to-be-searched information items included in the database to the keyword included in the specifying condition information based on the modified number of the to-be-searched information items corresponding to the keyword included in the specifying condition information.

2. The information processing apparatus as claimed in claim 1, wherein the to-be-searched information items is information on documents disclosing information related to patents, and
    wherein the classification information is at least one of: an International Patent Classification, a File Index, an F Term, and a Current US Classification.

3. The information processing apparatus as claimed in claim 1, wherein the population-limiting information obtaining unit obtains, as the population-limiting information, information on a specified information element specified in the specifying-condition information, wherein the specified information element is specified as information to be included in the to-be-searched information items.

4. The information processing apparatus as claimed in claim 1, wherein the population-limiting information obtaining unit obtains, as the population-limiting information, information on a specifying-information element specified in the specifying-condition information, wherein the to-be-searched information items including the specifying-information element is specified to be outside a scope for determining the order.

5. The information processing apparatus as claimed in claim 1, wherein the population-limiting information obtaining unit obtains, as the population-limiting information, additional-information specifying information which specifies, in the specifying-condition information, additional information added to the to-be-searched information items.

6. The information processing apparatus as claimed in claim 1, wherein the fitness calculating unit
determines an importance of an information element in calculating the fitness based on information-element inclusion mode information associated with the information element in a modified index information, and information indicating the number of the limited to-be-searched information items, and
calculates the fitness based on information on a frequency of occurrence of the information element in the respective to-be-searched information items, and information on the determined information element importance.

7. The information processing apparatus as claimed in claim 1, further comprising an information-amount obtaining unit which obtains information on a total of information amounts included by the respective limited plurality of to-be-searched information items, wherein
the fitness-calculating unit calculates the fitness based on information on the obtained information amount total.

8. The information processing apparatus as claimed in claim 1, further comprising an index information storage storing index information.

9. The information processing apparatus as claimed in claim 1, wherein the specifying-condition information analyzing unit extracts a plurality of keywords as information elements from the text inputted by the user.

10. The information processing apparatus as claimed in claim 1, wherein the text inputted by the user is a sentence and the specifying-condition information analyzing unit extracts, from the sentence, keywords which have meaning by themselves as information elements, and deletes words which do not have meaning by themselves.

11. The information processing apparatus as claimed in claim 1, wherein the fitness calculating unit further determines an importance of an information element in calculating the fitness based on an importance value calculated for the information element, wherein the importance value of the information element is based on a ratio of a total number of information items out of the plurality of to-be-searched information items to a frequency of a number of information items out of the plurality of to-be-searched information items that include the information element such that the importance value is inversely proportional to the frequency.

12. An information processing method, implemented on an information processing apparatus, which determines, based on a fitness to a specified condition, an order of displaying a plurality of to-be-searched information items which are pre-stored, comprising the steps of:
storing, in a storage unit, in association, a keyword included in the plurality of to-be-searched information items stored in a database, information identifying to-be-searched information items stored in the database that include the keyword out of the plurality of to-be-searched information items stored in the database, and the number of the to-be-searched information items stored in the database that include the keyword out of the plurality of to-be-searched information items stored in the database;
a specifying-condition information obtaining step of obtaining specifying-condition information of the specified condition, the specifying condition information includes text inputted by a user;
a specifying-condition information analyzing step of analyzing the text included in the specifying condition information and extracting at least one keyword as an information element;
an index-information obtaining step of obtaining the keyword stored in the storage unit, the information identifying to-be-searched information items, and the number of the to-be-searched information items
a population-limiting information obtaining step of obtaining population-limiting information indicating classification information which classifies the plurality of to-be-searched information items stored in the database from the obtained specifying-condition information;
an identifying information obtaining step of obtaining information identifying the plurality of to-be-searched information items matching the classification information indicated by the population-limiting information out of the plurality of to-be-searched information items stored in the database;
an index-information modifying step of modifying the number of the to-be-searched information items obtained in the index-information obtaining step to the number recalculated using only identifying information matching the identifying information obtained in the identifying information obtaining step out of the information identifying the to-be-searched information items obtained in the index-information obtaining step; and
a fitness calculating step of calculating the fitness of each of the plurality of to-be-searched information items included in the database to the keyword included in the specifying condition information based on the modified number of the to-be-searched information items corresponding to the keyword included in the specifying condition information.

13. A non-transitory computer readable storage medium storing a program, which when executed by an information processing apparatus, causes the information processing apparatus to perform a method which determines, based on a fitness to a specified condition, an order of displaying a plurality of to-be-searched information items which are pre-stored, the method comprising the steps of:
storing, in a storage unit, in association, a keyword included in the plurality of to-be-searched information items stored in a database, information identifying to-be-searched information items stored in the database that include the keyword out of the plurality of to-be-searched information items stored in the database, and the number of the to-be-searched information items stored in the database that include the keyword out of the plurality of to-be-searched information items stored in the database;
a specifying-condition information obtaining step of obtaining specifying-condition information of the specified condition, the specifying condition information includes text inputted by a user;

a specifying-condition information analyzing step of analyzing the text included in the specifying condition information and extracting at least one keyword as an information element;

an index-information obtaining step of obtaining the keyword stored in the storage unit, the information identifying to-be-searched information items, and the number of the to-be-searched information items;

a population-limiting information obtaining step of obtaining population-limiting information indicating classification information which classifies the plurality of to-be-searched information items stored in the database from the obtained specifying-condition information, an identifying information obtaining step of obtaining information identifying the plurality of to-be-searched information items matching the classification information indicated by the population-limiting information out of the plurality of to-be-searched information items stored in the database;

an index-information modifying step of modifying the number of the to-be-searched information items obtained in the index-information obtaining step to the number recalculated using only identifying information matching the identifying information obtained in the identifying information obtaining step out of the information identifying the to-be-searched information items obtained in the index-information obtaining step ; and a fitness calculating step of calculating the fitness of each of the plurality of to-be-searched information items included in the database to the keyword included in the specifying condition information based on the modified number of the to-be-searched information items corresponding to the keyword included in the specifying condition information.

\* \* \* \* \*